March 13, 1962 H. O. WALKER, JR 3,025,125
METHOD AND APPARATUS FOR PHOTOGRAPHING OSCILLOSCOPIC
SWEEP MAGNIFIED SIGNALS
Filed Aug. 6, 1957
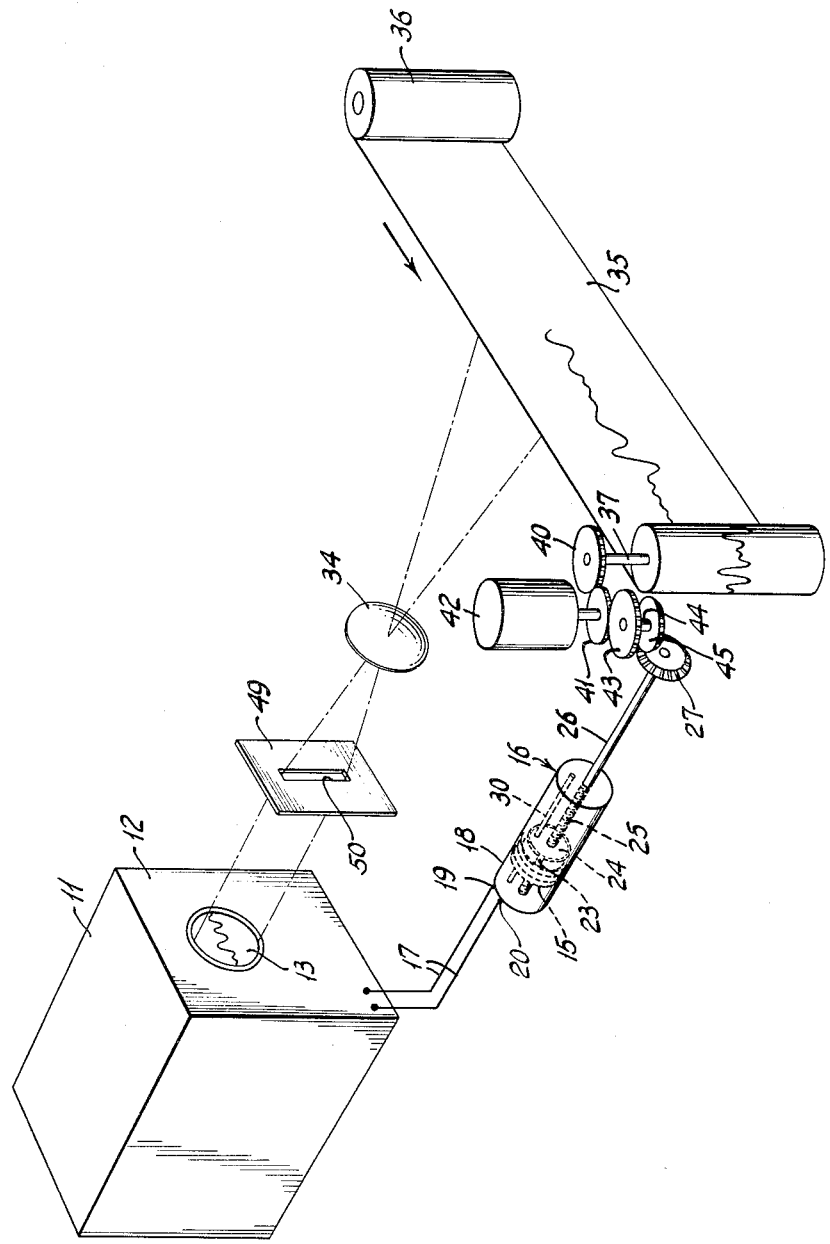

_United States Patent Office_

3,025,125
Patented Mar. 13, 1962

3,025,125
METHOD AND APPARATUS FOR PHOTO-GRAPHING OSCILLOSCOPIC SWEEP MAGNIFIED SIGNALS
Hugh O. Walker, Jr., Houston, Tex., assignor to Texaco Inc., a corporation of Delaware
Filed Aug. 6, 1957, Ser. No. 676,622
6 Claims. (Cl. 346—110)

This invention is concerned with a method and apparatus for photographing an entire electrical event, where the event has been expanded by the use of sweep magnification. More specifically, the invention is concerned with photographing of an entire event that has been magnified by sweep magnification, where a cathode ray oscilloscope is employed.

In general, this invention is applicable to transient phenomena where relatively high frequency changes or variations occur with respect to the time duration of the transient, and where the entire transient is of such short time duration as to render individual oscillograms of the separate events impractical. In other words, where a transient or other repetitive event (occurring at a high frequency rate of repetition) is composed of variations that are not repetitive in nature during each event so that the viewing of the entire repetitive event becomes overly compressed and renders the observation of the variations during the course of the event difficult; the excessive compression may be overcome with known techniques by making use of sweep magnification in cathode ray oscilloscope presentation. However, when sweep magnification is employed to expand the event that is under observation, only a given portion of the entire event is displayed on the face of the oscilloscope at a given setting of the circuit controls in the oscilloscope circuits.

An example of a transient phenomenon that has the above-indicated characteristics, such that a magnification of the signals being displayed is practically a necessity, is in the field of model study for seismograph exploration work; particularly that applicable to the seismic exploration carried on in the oil industry.

As already indicated above, cathode ray oscilloscope techniques are available today such that a repetitive event may be magnified (by the technique known as sweep magnification) to any desired extent within practical limitations. In general, this known technique involves a system whereby instead of providing the horizontal sweep time substantially equal to the time for a complete event of the repetitive event under display, a high-speed sweep is employed that takes only a fraction of the complete repetitive event time. By employing such a high-speed sweep (the trace of which traverses the full width of the oscilloscope) a given portion only of the entire repetitive event is displayed on the scope, in an expanded or magnified form. In addition, by adjusting the period of time (relative to the beginning of the repetitive event period) when the high-speed sweep is commenced; the particular portion of the entire event that is to be displayed in expanded form, may be set or determined. In other words, by adjusting the delay time from the beginning of each event before the high-speed sweep time commences, the relative location of that portion of the entire event which is to be displayed in magnified form, is directly determined. Thus, by making such delay time adjustment, the portion being displayed may be moved from one end of the event to the other. Although, of course, the displayed portion which is thus magnified remains completely filling the scope at all times.

In order to photograph the entire event in magnified form where sweep magnification is being employed, it was previously necessary to make separate photographs of individual portions of the whole event and piece these together to provide the photograph of the entire event. The necessity for thus taking separate photographs of individual portions of the whole event has been eliminated by this invention, such that a continuous complete photograph may be taken of the entire event as expanded, from beginning to end thereof.

Thus, it is an object of this invention to provide a method and apparatus that are both simple and reliable and that provide for the photographing of an entire magnified repetitive event on a single continuous photographic strip.

Briefly, the invention is concerned with an oscilloscope signal presentation that employs sweep magnification, and wherein the method of photographing the entire repetitive event on a single continuous photographic strip, comprises the steps of adjusting the control of what portion of the repetitive event is being displayed on the oscilloscope, and moving said strip synchronously with said adjustment. The method also includes the step of photographing the oscilloscope display on said strip including the entire repetitive event from one end to the other.

Briefly, the invention insofar as its apparatus aspects are concerned, may be described as being related to the field of oscilloscope signal presentation employing sweep magnification. In such field, the invention deals with apparatus for photographing the entire repetitive event on a single continuous photographic strip, and comprises means for adjusting the control of what portion of the repetitive event is being displayed from the oscilloscope, and means for moving said strip synchronously with said adjustment. The apparatus also comprises means for photographing the oscilloscope display on said strip including the entire repetitive event as magnified from one end thereof to the other.

The above and other objects and benfits of the invention will be made more clear by the following more detailed description, that is illustrated in the drawing in which;

The single FIGURE of the drawing is a schematic showing in perspective, indicating the various elements involved in a system for carrying out the invention.

As already indicated to some extent above, it is to be noted that the invention is concerned with an oscillographic type of display wherein magnification of a given repetitive event is carried out. In the field of cathode ray oscilloscopes, there is a known technique for obtaining a so-called "sweep magnification" of varying degrees. Different commercial instruments are currently available, including auxiliary circuit equipment for accomplishing such sweep magnification.

In connection with this invention, it is to be noted that any of the commercial instruments that include controls of the above indicated type may be employed, or if desired, a simple cathode ray oscilloscope may be used with the necessary additional circuit controls added thereto for accomplishing the required sweep magnification.

For a proper understanding of this invention, it is important to understand sufficient of the operation of sweep magnification circuits so that the manner by which this invention makes use of the controls for such sweep magnification may be made clear. Thus, it is to be noted that in connection with sweep magnification of cathode ray oscilloscope viewing arrangements, there is a circuit control element usually in the form of a variable resistor. This variable resistor control element is the means by which the delayed location of a magnified portion of the repetitive event being viewed, may be determined.

In other words, the degree of magnification that is obtained by this type of cathode ray oscilloscope circuit, is determined by the time duration of a fast sweep signal that has a duration only a predetermined fraction of the complete period for each entire event of the repetitive event being viewed on the scope. Thus, magnification is obtained since this higher speed sweep signal (which only picks up some fraction of the entire event) is displayed across the entire width of the face of the cathode ray oscilloscope tube. Whereas when no magnification is had, the entire repetitive event must be displayed across the same width of the cathode ray tube. Now, by adjusting a delay circuit component, the location of the commencement of this fractional part of the whole repetitive event may be set anywhere from the beginning to the end of the complete event.

This delay circuit adjustment is ordinarily carried out by employing a variable resistor as the resistance element in an RC delay circuit, and arranged so that the time delay may be varied from zero to whatever maximum is required, to cause the beginning of the short time (high-speed) sweep period to be set as desired. Consequently, as the magnified portion of the entire repetitive event is being displayed on the face of the oscilloscope, the signal may be caused to shift by adjustment of the variable resistor so that the signal displayed will move, or be shifted, in accordance with the adjustment of the variable resistor which sets the delay time before the commencement of the high-speed short duration sweep.

In light of the above discussion, it will be clear that in order to photograph a magnified or expanded event from beginning to end thereof, it would be necessary to set the adjustment for what portion of the event is to be displayed in expanded form, and then take a photograph of that portion of the entire event. Thus, a plurality of photographs would have to be taken to make photographic record of the entire event as magnified, since at any given setting of the controls, only the corresponding portion of the whole event is displayed across the face of the oscilloscope. By making use of a method and/or apparatus in accordance with this invention, it becomes possible to photograph as a single unitary exposure the entire magnified event from beginning to end.

Referring to the figure of the drawings, it is pointed out that there is a cathode ray oscilloscope 11 that has on the front surface thereof, a panel 12 which carries the face of a cathode ray tube 13 thereon.

In ordinary useage, a cathode ray oscilloscope of this sort has the signals applied thereto so that the periodic sweep of the electron beam is carried out horizontally across a diameter of the tube 13. At the same time, the signal is applied vertically to the same electron beam, in order that the net effect is to trace the path of the electron beam in wave form, as it varies about a given zero horizontal axis.

When sweep magnification is employed with a cathode ray oscilloscope, the horizontal sweep of the electron beam is carried out in a relatively high-speed short duration manner, such that the duration of any given sweep is only a fraction of the duration of the period occupied by a repetitive event that is being viewed on the scope. The time when this short duration high-speed sweep begins, relative to each cycle of the repetitive event, may be controlled by means of electronic circuits (not shown) that include as the main control element thereof, a variable resistor 16 which may be connected into the control circuits for the oscilloscope 11 by means of a pair of wires 17 illustrated.

Variable resistor 16 may take various forms but it is preferred to employ something on the order of that illustrated, wherein there is a spiral wire wound resistor element 15 supported on the inner surface of a cylindrical housing 18. The spiraled resistance wire 15 makes electrical contact at one end thereof with one of a pair of terminals 19 or 20 for connection with one of the wires 17. There is a longitudinally slidable contactor 23 for making electrical contact with the turns of the wire wound resistor 15. Contactor 23 is carried by any convenient supporting structure, such as a disk-shaped support 24, that is in turn carried by a threaded shaft 25, which has a smooth extension 26 that carries a bevel gear 27 at one end thereof. The central opening through support disk 24 is provided with female threads matching the threads on shaft 25 so that upon rotation of shaft 25, the support 24 will be caused to move axially along the inside of cylindrical housing 18 of the variable resistor 16. To insure that the required axial movement takes place without any rotation around the shaft 25 by the support 24, there is a restraining element, such as a smooth shaft 30 that passes slidably through a hole in the support disk 24. This hole in disk 24 is located radially spaced from the threaded shaft 25 and parallel therewith.

Thus, the structure of a preferred form for the variable resistor is that commonly known as a travelling nut type of action. This provides for making smooth fine adjustment of the slider 23 over the wire wound resistor 15 that is employed, while obtaining the use of multiple rotations of the control shaft 26 of the variable resistor 16.

It will be clear to anyone skilled in the art that many variations could be had in the structure of the variable resistor 16, and no elaboration on this point is deemed necessary.

It will be clear that the circuit arrangement of variable resistor 16 is such that one of the terminals 19 or 20 is directly connected electrically to the smooth guide shaft 30, while the adjacent end of the wire wound resistor 15 is connected to the other of terminals 19 or 20. Then the amount of resistance that is in the circuit between terminals 19 and 20 is determined by the axial position of the slide contactor 23 in contact with the turns of resistor 15 along the inside of housing 18. This is because a direct low resistance path is always maintained between slider 23 and one of the terminals 19 or 20 via the support disk 24 and the guide rod or shaft 30.

In order to photograph the display on the face of cathode ray tube 13, there is a lens 34 situated at a proper distance from the face of tube 13, relative to a photographic film strip 35, so as to focus the image of the signal (as being traced on the face of cathode ray tube 13) onto the photo-sensitive surface of film strip 35. The film strip 35 is advanced horizontally, or parallel to the axis of the sweep employed in oscilloscope 11, so that it unrolls from a reel (not shown—carrying a roll 36 of the film) and is rolled up onto another reel (not shown) carried by, for rotation with, a shaft 37. The shaft 37 has attached at one end thereof, for positive rotation therewith, a gear 40 that meshes with a gear 41 carried by the shaft of a motor 42. Also meshing with gear 41, there is another gear 43 which is supported by one end of a stub shaft 44 that carries a bevel gear 45 at the other end thereof for meshing, in driving relation, with the bevel gear 27 located on the end of variable resistor control shaft 26.

It will be obvious that the elements (schematically illustrated) for photographical transferring an image of the signal on the face of oscilloscope 11, to the photosensitive surface of the film strip 35, will have to be enclosed in a light-tight structure; at least insofar as the lens 34 and film strip 35 are concerned.

It will be noted that there is shown a mask 49, having a relatively narrow opening 50 therein, that is located between the lens 34 and the face of the cathode ray tube 13. The purpose of the mask 49 is merely that of avoiding, or minimizing, the distortions that are present in the signals as displayed on the face of any ordinary cathode ray tube such as tube 13. Such distortions are greatest near the ends of the sweep by reason of the shape of the face of cathode ray tube. Consequently, by employing a mask, such as mask 49, to blank off the sides of the signal being displayed on the cathode ray tube 13, only the central portion of the signal is transmitted to the film strip 35 and the distorted edge portions are blanked off.

The dimensions of the driving connections between the motor 42 and film strip 35 on one hand, and motor 42 and resistance value of variable resistor 16 on the other, are such that, the speed of movement of the magnified signal as it traverses the length of the whole repetitive event (and is projected by photographic image onto the film strip 35) is equal to the speed of movement of the film strip 35 so that synchronism is maintained and the entire repetitive event as magnified may be photographed on a single continuous strip by one continuous exposure.

*Operation*

In operation, it is not necessary that the motor 42 be a constant speed type, or be held to any particular fixed velocity. This is by reason of the fact that once the ratio of the speed of drive for film strip 35, as related to the speed of adjustment of variable resistor 16, has been determined, any variations in the speed of drive of motor 42 acts synchronously to vary both the drive of film strip 35 and of the adjustment of variable resistor 16. Therefore, the relative movement of the image of the signal being displayed on cathode ray tube 13 and the film strip 35, will always be maintained at zero. Thus, it will be noted that as adjustment of the variable resistor 16 takes place, the signal being displayed on the face of cathode ray tube 13 appears in effect to move correspondingly across the tube face. By properly adjusting the speed of movement of the film strip 35 (so that it is in synchronism with the apparent movement of the signal across the face of cathode ray tube 13) a relative zero movement is set up, so that by beginning at one end of the entire repetitive event, the film strip 35 may be driven across the field of the image of the expanded, or magnified, portion of the whole event signal at the same rate as the magnified portion of the whole event signal is moved across the entire event. In this manner, a single continuous photographic exposure is made for an entire repetitive event, that is in expanded form.

The photographic principles involved are similar to those involved in aerial photography, where the film speed is synchronized with the movement of the aircraft over the surface of the ground in order to make a continuous photograph of a large area strip as a single continuing unitary exposure.

It is pointed out that in carrying out the steps of the invention, other and different apparatus might be employed from that illustrated in the preferred embodiment. For example, by careful manipulation, the film strip 35 might be advanced in synchronism with the image of the expanded portion of the repetitive event using manual drives for each.

It is also pointed out that many relatively diverse uses of this invention will suggest themselves to anyone skilled in the art. For example, a study of the behaviour of firing of spark plugs, or dynamometer studies.

As a specific example of the actual values involved in the use of this invention for seismic model study work, the following times are representative of one particular study. A repetitive event is commenced once every five hundred micro-seconds. This is expanded, or magnified, about ten times by using a horizontal sweep signal of fifty micro-seconds duration that may be commenced anywhere from the beginning of each event up to four hundred and fifty micro-seconds after the beginning of each event. The time involved in making the adjustment which sets the delay time the commences with each event (five hundred micro-seconds) and the commencing of each expanded portion (fifty micro-seconds), is not related to the foregoing event times. It is merely determined so that the speed of travel of the film strip is convenient, e.g., about one hundred inches per minute.

While a particular embodiment of the invention, has been described in considerable detail, this is not to be taken as in any way limiting the invention, but merely as being descriptive thereof.

It is claimed:

1. In oscilloscope signal presentation employing sweep magnification, apparatus for photographing the entire repetitive event on a single continuous photographic strip, comprising means for adjusting the control that determines what portion of the repetitive event is being displayed on the oscilloscope, means for moving said strip synchronously with said adjustment, and means for photographing the oscilloscope display on said strip, in order to include the entire repetitive event as magnified.

2. In oscilloscope signal presentation employing sweep magnification, apparatus for photographing the entire repetitive event on a single continuosu photographic strip, comprising variable resistance means for adjusting the control that determines what portion of the repetitive event is being displayed on the oscilloscope, mechanical connections for controlling said variable resistance means and simultaneously moving said strip at the same speed as the image of said portion moves during changes in said variable resistance control, and means for photographically focussing the oscilloscope display on said strip including means for reducing the distortions present near the edges of said display.

3. In oscilloscope signal presentation employing sweep magnification, apparatus for photographing the entire repetitive event on a single continuous photographic strip, comprising multiple turn control variable resistance means for adjusting the control that determines what portion of the repetitive event is being displayed on the oscilloscope, a motor, gear train connections for controlling said variable resistance means and simultaneously moving said strip at the same speed as the image of said portion moves during the changes in said variable resistance means, and means for photographically focussing the oscilloscope display on said strip including a mask for limiting the image to the central part of the oscilloscope display.

4. In cathode ray oscilloscope signal presentation having a beam that is deflected about one axis lying perpendicular to said beam, and is deflected about a second axis perpendicular to said one axis, and wherein a repetitive event having a predetermined time duration from beginning to end thereof is applied to deflect said beam about said one axis, and wherein a linear sweep signal is applied to deflect said beam about said second axis, said sweep signal having a shorter time duration than said repetitive event so that only a fraction of the event is displayed on the face of said oscilloscope but is displayed across the full width thereof to be thus sweep magnified, and wherein said oscilloscope has time delay means associated with said sweep signal in order to adjust the commencement of said sweep signal from beginning to end of said repetitive event whereby that portion of the event that is being magnified and displayed is thus moved from beginning to end relative to said entire repetitive event; the combination comprising apparatus for photographing the entire repetitive event on a continuous photographic strip, said apparatus comprising means for adjusting said time delay means, means for moving said strip synchronously with said adjustment, and means for photographing the oscilloscope display on said strip.

5. In cathode ray oscilloscope signal presentation having a beam that is deflected about one axis lying perpendicular to said beam, and is deflected about a second axis perpendicular to said one axis, and wherein a repetitive event having a predetermined time duration from beginning to end thereof is applied to deflect said beam about said one axis, and wherein a linear sweep signal is applied to deflect said beam about said second axis, said sweep signal having a shorter time duration than said repetitive event so that only a fraction of the event is displayed on the face of said oscilloscope but is displayed across the full width thereof to be thus sweep magnified, and wherein said oscilloscope has time delay means associated with said sweep signal in order to adjust the commencement of said sweep signal from beginning to end of said repetitive event whereby that portion of the event that is being magnified and displayed is thus moved from beginning to end relative to said entire repetitive event; the combination comprising apparatus for photographing the entire repetitive event on a continuous photographic strip, said apparatus comprising variable resistance means for adjusting said time delay means, mechanical connections for controlling said variable resistance means and simultaneously moving said strip at the same speed as said sweep magnified portion of the event moves relative to the entire event, and means for photographing the oscilloscope display on said strip.

6. In cathode ray oscilloscope signal presentation having a beam that is deflected about one axis lying perpendicular to said beam, and is deflected about a second axis perpendicular to said one axis, and wherein a repetitive event having a predetermined time duration from beginning to end thereof is applied to deflect said beam about said one axis, and wherein a linear sweep signal is applied to deflect said beam about said second axis, said sweep signal having a shorter time duration than said repetitive event so that only a fraction of the event is displayed on the face of said oscilloscope but is displayed across the full width thereof to be thus sweep magnified, and wherein said oscilloscope has time delay means associated with said sweep signal in order to adjust the commencement of said sweep signal from beginning to end of said repetitive event whereby that portion of the event that is being magnified and displayed is thus moved from beginning to end relative to said entire repetitive event; the combination comprising apparatus for photographing the entire repetitive event on a continuous photographic strip, said apparatus comprising multiple turn control variable resistance means for adjusting said time delay means, a motor, gear train connections for controlling said said variable resistance means and simultaneously moving said strip at the same speed as said sweep magnified portion of the event moves relative to the entire event, and means for photographing the oscilloscope display on said strip, whereby the entire repetitive event is photographed continuously on a single strip in the magnified form throughout even though only the foregoing portion of the event is being displayed by the oscilloscope for any single setting of variable resistance means.

References Cited in the file of this patent

UNITED STATES PATENTS

| | | |
|---|---|---|
| 2,241,432 | Ardenne et al. | May 13, 1941 |
| 2,300,189 | Wolff | Oct. 27, 1942 |
| 2,425,003 | Potter | Aug. 5, 1947 |
| 2,551,597 | Hall | May 8, 1951 |
| 2,629,829 | Daly | Feb. 24, 1953 |
| 2,849,609 | Casey | Aug. 26, 1958 |
| 2,859,377 | Clemens et al. | Nov. 4, 1958 |
| 2,932,549 | Kling et al. | Apr. 12, 1960 |